United States Patent [19]

Thomas et al.

[11] Patent Number: 4,643,848

[45] Date of Patent: Feb. 17, 1987

[54] MODIFIED ROSIN ESTER PREPARATION

[75] Inventors: John H. Thomas, Jacksonville, Fla.; Don P. Duncan; Michael A. Lake, both of Mt. Pleasant, S.C.; Gary B. Womack, Charleston, S.C.

[73] Assignee: Westvaco Corporation, New York, N.Y.

[21] Appl. No.: 831,809

[22] Filed: Feb. 21, 1986

[51] Int. Cl.$^4$ .............................. C09F 7/00; C09F 1/04; C09F 9/00

[52] U.S. Cl. .................................. 260/104; 527/602; 527/604

[58] Field of Search ................. 527/602, 603, 604; 260/103, 104

[56] References Cited

U.S. PATENT DOCUMENTS

| | | | |
|---|---|---|---|
| 2,369,125 | 2/1945 | Anderson | 260/104 |
| 2,572,086 | 10/1951 | Wittcoff et al. | 260/26 |
| 2,590,910 | 4/1952 | Wittcoff et al. | 260/104 |
| 2,729,660 | 1/1956 | Harrison | 260/410.6 |
| 3,071,604 | 1/1963 | Mohan et al. | 260/410.6 |
| 3,232,968 | 2/1966 | Schenck et al. | 252/117 |
| 3,317,445 | 5/1967 | Halbrook et al. | 527/604 |
| 3,780,012 | 12/1973 | Smith | 260/97.5 |
| 3,780,013 | 12/1973 | Smith | 260/97.5 |
| 4,172,070 | 10/1979 | Scharrer | 260/104 |
| 4,548,746 | 10/1985 | Duncan et al. | 260/97.5 |

FOREIGN PATENT DOCUMENTS 979673 1/1965 United Kingdom .

Primary Examiner—Herbert S. Cockeram
Attorney, Agent, or Firm—Terry B. McDaniel; Richard L. Schmalz

[57] ABSTRACT

Phosphinic acid (also called hypophosphorous acid), when used in very small quantities, is disclosed to act as a catalyst to accelerate the reaction of rosin with an unsaturated dibasic acid to form a modified rosin for subsequent esterification with a polyhydric alcohol. According to the process of the invention, a rosin is reacted with an unsaturated dibasic acid such as maleic anhydride or fumaric acid in the presence of phosphinic acid at a temperature of from about 180° C. to about 220° C. When the modified rosin is subsequently esterified, the rosin ester exhibits improved color, softening point, and viscosity in a specified solution.

20 Claims, No Drawings

MODIFIED ROSIN ESTER PREPARATION

BACKGROUND OF THE INVENTION

1. Field of the Invention

This invention relates to a novel method of producing various types of modified rosin resin esters of polyhydric alcohols. These modifications include the addition of maleic anhydride or other unsaturated dibasic acids to rosin. In particular, this invention relates to reacting rosin and the unsaturated dibasic acid in the presence of very low quantities of phosphinic acid, as a catalyst. The modified rosin is subsequently reacted with one or more various polyhydric alcohols to form modified rosin resins having improved properties such as color, softening point and viscosity in a specified solution.

2. Description of the Prior Art

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin and tall oil rosin.

The natural separation and gradual conversion of some of the hydrophilic components of sap and related plant fluids from the cambium layer of a tree into increasingly hydrophobic solids are the generic process of forming diverse gums, resins and waxes. The oleoresin intermediate in this process is typified in pine gum, which flows from hacks on the trunks of southern yellow pine primarily in Portugal, Brazil and China, as well as and in other countries. Pine gum contains about 80% (gum) rosin and about 20% turpentine.

Resinification from oleoresin can result from either natural evaporation of oil from an extrudate or slow collection in ducts in sapwood and heartwood. Pinus stumps are valuable enough to be harvested, chipped, and extracted with hexane or higher-boiling paraffins to yield wood rosin, wood turpentine, and other terpene-related compounds by fractional distillation. In the kraft, i.e., sulfate, pulping process for making paper, pinewood is digested with alkali producing crude tall oil and crude sulfate turpentine as by-products. Fractionation of the crude tall oil yields tall oil rosin and fatty acids.

Prior to this invention dibasic modified rosin esters of polyhydric alcohols were produced by adducting as much as 30% (based on the weight of the rosin) fumaric acid or maleic anhydride to the rosin by thermally driving the reaction to completion. Reaction times as long as four (4) hours could be expected when performing this addition at 180° C. to 210° C. Fumaric acid additions take a longer time to complete than maleinized adducts; however, maleic anhydride adducts yield a darker colored product. High levels of unsaturated dibasic acids are used to give the resin the basis for the high molecular weights needed to meet certain performance criteria such as hardness, or softening point, viscosity, and rub resistance, as well as other specific end use demands.

Also incorporated into some resins is the addition to the rosin of a phenolic-formaldehyde condensate. Prior to this invention it has been difficult to form an adduct of most common grades of rosin by reacting the rosin with a smaller level of a phenolic-formaldehyde, followed by a higher level of fumaric acid. The nature of this problem is not definitely known, but it is theorized that the rosin-phenolic condensation product somehow blocks the fumaric addition reactions.

This problem is not evident when the phenolic is followed by a maleic anhydride addition, but again the maleic adduct gives darker colors which are unacceptable for use in the application for which the resin is intended. The phenolicformaldehyde condensate addition product contributes better drying speed to the resin.

The above mentioned modified rosins upon completion are then esterified with one or more polyhydric alcohols such as pentaerythritol, glycerine, sorbitol, or trimethylolpropane. The esterification reaction is carried out at temperatures of 215° C. to 280° C. depending upon the polyalcohol used. The esterification reaction may be carried out to an acid number of 220 to 15, depending upon the level of modification of the rosin and the end use for which the resin is intended. This esterification step can be carried out at atmospheric or reduced pressure typically with the use of a calcium hydroxide catalyst.

The beneficial product characteristics provided by rosin esterification for various applications have led to the development of many esterification procedures, particularly treatments with polyhydric alcohols. U.S. Pat. Nos. 2,369,125, 2,590,910 and 2,572,086 teach rosin esterification with glycerol and pentaerythritol, among other polyhydric alcohols, usually preceded by a rosin disproportionation step.

It is generally known in the art that a significant disadvantage of pentaerythritol esterification of tall oil rosin is the deterioration of rosin color in the ester product. For a tall oil rosin with a starting color of 8 on the Gardner scale, a pentaerythritol ester would have a color of 13-18 while a glycerol ester would have a color of 8-9. Also, extremely long reaction times are required to make the tall oil rosin-pentaerythritol esters (up to 30-48 hours) as compared to making tall oil rosin-glycerol esters under identical conditions (10-12 hours).

U.S. Pat. Nos. 3,780,012 and 3,780,013 acknowledge that tall oil rosin darkens significantly upon pentaerythritol esterification and propose alternative solutions. U.S. Pat. No. 3,780,012 teaches pretreating the rosin with catalytic amounts of paraformaldehyde followed by distillation prior to the esterification reaction. U.S. Pat. No. 3,780,013 teaches the incremental addition of a phenol sulfide compound during the esterification. The color of the product of these procedures was claimed to be an M on the U.S.D.A. scale. Also, the patents' examples employed a 20% equivalent excess of pentaerythritol.

U.S. Pat. No. 2,729,660 also acknowledges the darkening effect which common esterification catalysts such as strong acids cause on the product during esterification. The patent teaches the use of 0.5 to 5% of either the aliphatic or aromatic esters of phosphorous acid as a catalyst for the esterification of higher fatty acids or rosin acids, or mixtures thereof. In addition to avoiding appreciable color formation during the esterification, a reduction in reaction time is noted. A distinct disadvantage of the process is the dissociation, during esterification, of the alcohol used to make the phosphite ester catalyst resulting in a disagreeable odor.

Also, U.S. Pat. No. 4,172,070 teaches employing arylsulfonic acid in place of the traditional basic esterification catalysts, such as calcium oxide, to reduce the time for tall oil rosin-pentaerythritol esterification to obtain a rosin ester of improved oxygen stability, color and softening point. This work is confounded, however, by the unusually large amount of pentaerythritol used (35% equivalent excess) which by itself would markedly increase the rate of acid number drop. Products with Ring and Ball softening points of 77° C. to 86.5° C. were obtained. Normal commercial pentaerythritol esters of rosins soften between 95° C. and 105° C.

The primary object of this invention is to provide a novel method of preparing the above mentioned phenolic dibasic modified rosin resins that yields products with lighter colors without adversely affecting viscosities and softening points and facilitates the addition of a phenolic-formaldehyde condensate prior to a fumaric acid addition to the rosin.

SUMMARY OF THE INVENTION

The above objectives are met in the discovery that phosphinic acid (also known as hypophosphorous acid), when used in small quantities, acts as a catalyst to accelerate the unsaturated dibasic acid additions as well as enables the addition of high levels fumaric acid to a rosin that has been previously adducted with small levels of a phenolic-formaldehyde condensate. The phosphinic acid also accelerates the subsequent esterification reaction, while maintaining excellent color in the final resin.

DESCRIPTION OF THE PREFERRED EMBODIMENT

Phosphinic acid is a strong, reducing acid, useful for its antioxidant or color-reducing properties in the preparation of light colored fatty acid taurates (U.S. Pat. No. 3,232,968), carboxylic acid esters with poly(oxyalkylene) compounds (British Pat. No. 979,673 and U.S. Pat. No. 3,071,604), acrylic and methacrylic esters of glycols (Japanese Pat. No. 73 11084), or in light colored alkyd resins (Japanese Pat. No. 12997). Also, phosphinic acid has been used as a tall oil treatment agent to convert the impurities and color bodies contained therein to a nondistillable form and to promote decarboxylation of rosin acids present (U.S. Pat. No. 2,441,197).

A novel method of producing modified rosin resin esters of polyhydric alcohols is now provided involving the use of very small quantities of phosphinic acid as the catalyst for the rosin modification step and subsequent esterification.

As polyhydric alcohols, ethylene glycol, propylene glycol, diethylene glycol, triethylene glycol, tetraethylene glycol, trimethylene glycol, glycerol, pentaerythritol, dipentaerythritol, tripentaerythritol, trimethylolethane, trimethylolpropane, mannitol, sorbitol, as well as combinations of the aforementioned and other similar polyhydric alcohols may be used. The amount of the alcohol used in the esterification may be varied widely but generally no more than an approximate 20% excess over the equivalent combining proportion will be necessary.

When glycerol is used for the esterification of the modified rosin, an esterification catalyst is usually not required; and the residual phosphinic acid from the rosin modification step may be preferably neutralized with sodium hydroxide, monoethanolamine, or other basic compound.

When a polyhydric alcohol other than glycerol is reacted with the modified rosin in the presence of phosphinic acid, low acid numbers may be facilitated by following the reaction with addition of up to 10% glycerol when the acid value is reduced to 50 or below.

In general, the rosin is heated under an inert environment to 180° C. At this time, from 0.05%, but less than 0.5% phosphinic acid, based on the weight of the rosin, is added to the molten rosin and allowed to mix well. A greater amount of phosphinic acid may be used, but no benefit is derived from amounts of 0.5% or greater. To this blend are added the desired resin components such as maleic anhydride, fumaric acid, or a substituted phenol-formaldehyde blend. The dibasic acid addition is carried out at temperatures of from about 180° C. to about 220° C. When a phenol-formaldehyde blend is employed, the condensation is carried out at 125° C.–140° C. to minimize loss of formaldehyde. After the phenolic-condensation is complete, the temperature is increased to from about 180° C. to about 200° C.; and the dibasic acid is added. After the dibasic acid has reacted, the molten product is heated to the appropriate esterification temperature and reacted with the desired polyhydric alcohol at a temperature of 180°–300° C. until the desired acid value is obtained.

The following examples serve to illustrate the modified rosin-polyhydric alcohol esters made by the invention process. Unless otherwise specified, the parts are by weight.

EXAMPLE 1

To a suitable reaction vessel equipped with an overhead stirrer, condenser and thermometer was added 1,000 parts tall oil rosin. The rosin was heated under an inert gas blanket until molten. As the temperature reached 180° C., 1.0 part of 50% active aqueous solution of phosphinic acid was added. To this mixture were added 62.0 parts of maleic anhydride. The inert gas was stopped. The maleic anhydride was allowed to react with the rosin for one hour at 250° C.

After this time period, 163 parts pentaerythritol was added. The temperature was increased to 285° C. and held until the acid value was less than 25.

The same procedure was carried out without using phosphinic acid. The results are shown in Table I. (In this and the following examples, viscosity is measured as a Gardner-Holt type; and color measurements are expressed using the Gardner scale.)

TABLE I

MODIFIED ROSIN ESTER PROPERTIES

| | Reaction Conditions | |
|---|---|---|
| Property | Without Phosphinic | With Phosphinic |
| Acid Value | 23.2 | 24.3 |
| Softening Point | 119° C. | 125° C. |
| Viscosity, 50% in Aliphatic Oil | Y | Z4+ |
| Color, 50% in Aliphatic Oil | 11 | 8 |
| Reaction Time | 8 hours | 7 hours |

EXAMPLE 2

To a suitable reaction flask, equipped as in Example 1, were added 750 parts gum rosin and 250 parts tall oil rosin. The blend was melted under an inert gas blanket until molten. As the temperature reached 180° C., 1.2 parts 50% active phosphinic acid was added and allowed to mix well. To this mixture was added 285 parts fumaric acid. The fumaric was allowed to react until clarity at 205° C. After which, the phosphinic acid was neutralized with 1.5 parts monoethanolamine.

To this molten product 62 parts glycerine and 37 parts sorbitol were added. The product was heated to 215° C. and held until the acid value was less than 215.

A similar resin was prepared without using the phosphinic acid. The results were as shown in Table II.

TABLE II

MODIFIED ROSIN ESTER PROPERTIES

| Property | Reaction Conditions | |
|---|---|---|
| | Without Phosphinic | With Phosphinic |
| Acid Value | 210 | 212 |
| Softening Point | 154° C. | 155° C. |
| Fumaric Reaction Time | 2.1 hours | 1.0 hour |
| Total Reaction Time | 4.0 hours | 3.5 hours |
| Viscosity, 60% in Ethanol | H-I | J |
| Color, 60% in Ethanol | 8-9 | 7+ |
| Color in a 5% Ammonium Solution (15% solids) | 5-6 | 5+ |

EXAMPLE 3

To a suitable reaction vessel equipped as in Example 1 1,000 parts tall oil rosin was added. The rosin was heated under an inert gas blanket until molten. As the temperature reached 180° C., 1.2 parts 50% active aqueous solution of phosphinic acid was added and allowed to mix thoroughly. The temperature of the mixture was increased to 205° C., and 283 parts fumaric acid was added. The inert blanket was discontinued. The fumaric-rosin mixture was allowed to react at 205° C. until complete.

After formation of the adduct, 109 parts pentaerythritol was added, and the temperature increased to 220° C. This mixture was held until the acid value was below 200.

A similar reaction also was carried out without using the phosphinic acid. A comparison of the products made with and made without phosphinic acid as catalyst is given in Table III.

TABLE III

MODIFIED ROSIN ESTER PROPERTIES

| Property | Reaction Conditions | |
|---|---|---|
| | Without Phosphinic | With Phosphinic |
| Acid Value | 200 | 197 |
| Softening Point | 156° C. | 155° C. |
| Viscosity, 60% in Ethanol | L-M | O |
| Color, 60% in Ethanol | 10+ | 7+ |
| Reaction Time for Adduct | 4 hours | 3 hours |
| Total Reaction Time | 7 hours | 5 hours |

EXAMPLE 4

To a suitable reaction vessel, equipped as in Example 1, was added 100 parts gum rosin. The rosin was heated under an insert gas blanket to 180° C. at which time 0.1 part of 50% active phosphinic acid was added and stirred in well. Maleic anhydride (6.2 parts) was then added and the mixture stirred for one hour at 180° C. The temperature was then raised to 200° C., and 16.3 parts pentaerythritol was added. The temperature was increased to 280° C. and held until the acid value was less than 30.

The same procedure was carried out without using phosphinic acid. The results are shown in Table IV.

TABLE IV

MODIFIED ROSIN ESTER PROPERTIES

| Property | Reaction Conditions | |
|---|---|---|
| | Without Phosphinic | With Phosphinic |
| Acid Value | 18 | 29 |
| Softening Point | 146° C. | 138° C. |
| Viscosity, 33% in Linseed Oil | Z | W+ |
| Color, 33% in Linseed Oil | 13+ | 10+ |

EXAMPLE 5

To a suitable reaction vessel, equipped as in Example 1, was added 100 parts tall oil rosin. The rosin was heated under an inert gas blanket to 150° C. at which time 0.05 part magnesium oxide and 10 parts of cresol were added. The mixture was then allowed to cool to 130° C., whereupon, 5.58 parts of paraformaldehyde were added. The temperature of this mixture was held at 130° C. for one hour, then increased to 180° C. At this time, 0.10 part of 50% active phosphinic acid was added and stirred in well, after which 12.12 parts pentaerythritol was added. The temperature was increased to 280° C. and held until the acid value was less than 2.5.

The same procedure was carried out except replacing the phosphinic acid with 0.05 parts of lime. The results are shown in Table V.

TABLE V

MODIFIED ROSIN ESTER PROPERTIES

| Property | Reaction Conditions | |
|---|---|---|
| | Without Phosphinic | With Phosphinic |
| Acid Value | 19 | 20 |
| Softening Point | 110° C. | 110° C. |
| Viscosity, 33% in Linseed Oil | S− | R+ |
| Color, 33% in Linseed Oil | 11 | 9+ |

EXAMPLE 6

To a suitable reaction vessel, equipped as in Example 1, was added 100 parts tall oil rosin. The rosin was heated under an inert gas blanket to 150° C. at which time 0.05 parts magnesium oxide and 15 parts nonylphenol were added. The mixture was then allowed to cool to 125° C., whereupon, 5.1 parts of paraformaldehyde were added. The temperature of this mixture was held at 125° C. for one hour, then increased to 180° C. At this time, 0.10 part of 50% active phosphinic acid was added and stirred in well, after which 3.0 parts of maleic anhydride were added. The mixture was stirred at 180° C. for 1 hour; then the temperature was increased to 200° C. and 13.9 parts of pentaerythritol were added. The temperature was increased to 250° C., held for 0.5 hours, then raised to 280° C. and held for an acid value less than 25.

The same procedure was carried out without using phosphinic acid. The results are shown in Table VI.

TABLE VI

| Property | Reaction Conditions | |
|---|---|---|
| | Without Phosphinic | With Phosphinic |
| Acid Value | 18.4 | 19.7 |
| Softening Point | 128° C. | 131° C. |
| Viscosity, 35% Aliphatic Oil | E-F | C |
| Color, 35% Aliphatic Oil | 9-10 | 8+ |

What is claimed is:

1. A process for esterifying modified rosin comprising the steps of
   (a) reacting rosin in its molten state with an unsaturated dibasic acid in the presence of a catalytic amount of phosphinic acid to prepare the modified rosin, and
   (b) reacting the modified rosin with a polyhydric alcohol to form a modified rosin ester.

2. The process of claim 1 wherein step (a) is preceded by reacting the molten rosin with a phenol-formaldehyde blend in the presence of the phosphinic acid.

3. The process of claim 2 wherein the catalytic amount of phosphinic acid is from 0.05% to less than 0.5%, based on the weight of the rosin.

4. The process of claim 1 wherein the rosin is selected from the group consisting of tall oil rosin, gum rosin, and wood rosin.

5. The process of claim 1 wherein the unsaturated dibasic acid is selected from the group consisting of maleic anhydride and fumaric acid.

6. The process of claim 1, 2, 3, 4, or 5 wherein the polyhydric alcohol is selected from the group consisting of ethylene glycol, propylene glycol, diethylene glycol, triethylene glycol, tetraethylene glycol, trimethylene glycol, pentaerythritol, dipentaerythritol, tripentaerythritol, trimethylolethane, trimethylolpropane, mannitol, sorbitol, and mixtures thereof.

7. The process of claim 6 comprising an additional step (c) of adding up to 10% glycerol to the esterification reaction when the acid value is reduced to 50 or below.

8. The process of claim 1, 2, 3, 4, or 5 wherein the polyhydric alcohol is glycerol and step (b) is preceded by neutralization of the phosphinic acid catalyst by addition of a basic compound to the modified rosin.

9. The process of claim 8 wherein the basic compound is monoethanolamine.

10. The process of claim 1 wherein step (a) is conducted in an inert environment at a temperature of from about 180° C. to about 220° C. and step (b) is conducted in an inert environment at a temperature of from about 180° C. to about 300° C.

11. In a process of esterifying a modified rosin comprising the steps of reacting molten rosin with an unsaturated dibasic acid to prepare the modified rosin and reacting the modified rosin with a polyhydric alcohol to form a modified rosin ester, the improvement of conducting the rosin modifying reaction in the presence of a catalytic amount of phosphinic acid.

12. The process of claim 11 wherein the rosin modifying reaction is preceded by reacting the molten rosin with a phenol-formaldehyde blend in the presence of the phosphinic acid to form a rosin-phenol condensate.

13. The process of claim 12 wherein the catalytic amount of phosphinic acid is from 0.05% to less than 0.5%.

14. The process of claim 11 wherein the rosin is selected from the group consisting of tall oil rosin, gum rosin, and wood rosin.

15. The process of claim 11 wherein the unsaturated dibasic acid is selected from the group consisting of maleic anhydride and fumaric acid.

16. The process of claim 11, 12, 13, 14, or 15 wherein the polyhydric alcohol is selected from the group consisting of ethylene glycol, propylene glycol, diethylene glycol, triethylene glycol, tetraethylene glycol, trimethylene glycol, pentaerythritol, dipentaerythritol, tripentaerythritol, trimethylolethane, trimethylolpropane, mannitol, sorbitol, and mixtures thereof.

17. The process of claim 11, 12, 13, 14, or 15 wherein the polyhydric alcohol is glycerol and the reaction with the modified rosin is preceded by neutralization of the phosphinic acid catalyst by addition of a basic compound to the modified rosin.

18. The process of claim 17 wherein the basic compound is monoethanolamine.

19. The process of claim 11 wherein the rosin modifying reaction is conducted in an inert environment at a temperature of from about 180° C. to about 220° C. and the modified rosin ester is formed in an inert environment at a temperature of from about 180° C. to about 300° C.

20. The process of claim 12 wherein the rosin-phenol condensate is formed in an inert environment at a temperature of from about 125° C. to about 140° C.

* * * * *